United States Patent [19]
Renault

[11] 3,712,167
[45] Jan. 23, 1973

[54] CHORD SLIDE RULE FOR MUSICAL INSTRUMENTS

[75] Inventor: Jacques R. Renault, 1210 South Drive, Socorro, N. Mex. 87801

[22] Filed: Feb. 24, 1972

[21] Appl. No.: 228,806

[52] U.S. Cl. ................84/485, 84/471, 84/477 R
[51] Int. Cl. .............................................G09b 15/02
[58] Field of Search ...................84/470–473, 477 R, 84/483, 485

[56] References Cited

UNITED STATES PATENTS

| | | | |
|---|---|---|---|
| 1,300,193 | 4/1919 | Raff | 84/485 |
| 2,814,231 | 11/1957 | Jones | 84/485 |
| 3,668,967 | 6/1972 | Malis | 84/485 |

FOREIGN PATENTS OR APPLICATIONS 1,512,399    1/1968    France ...................84/485

*Primary Examiner*—Richard B. Wilkinson
*Assistant Examiner*—John F. Gonzales
*Attorney*—James E. Snead et al.

[57] ABSTRACT

A slide rule for determining and displaying finger positions for various chords on the finger board of a stringed instrument, consisting of a primary transparent cursor on which is displayed the finger board grill of a stringed instrument and a tonality scale, and a plurality of secondary transparent cursors arranged to slide adjacent to and independent of each other and of the primary cursor with marks and scales displayed upon said plurality of secondary transparent cursors so that all possible finger positions on the stringed instrument can be displayed on the slide rule for any predetermined chord.

6 Claims, 13 Drawing Figures

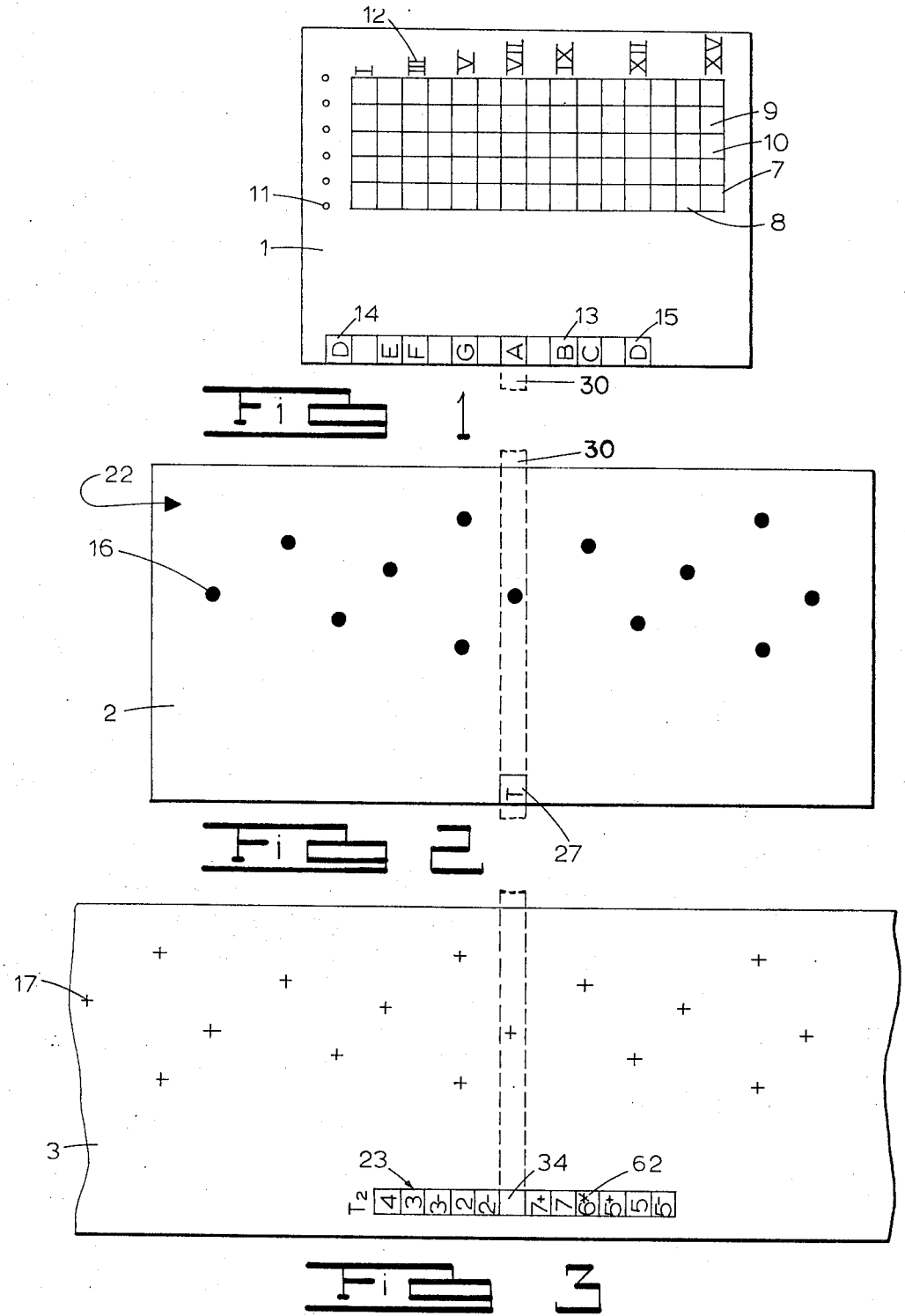

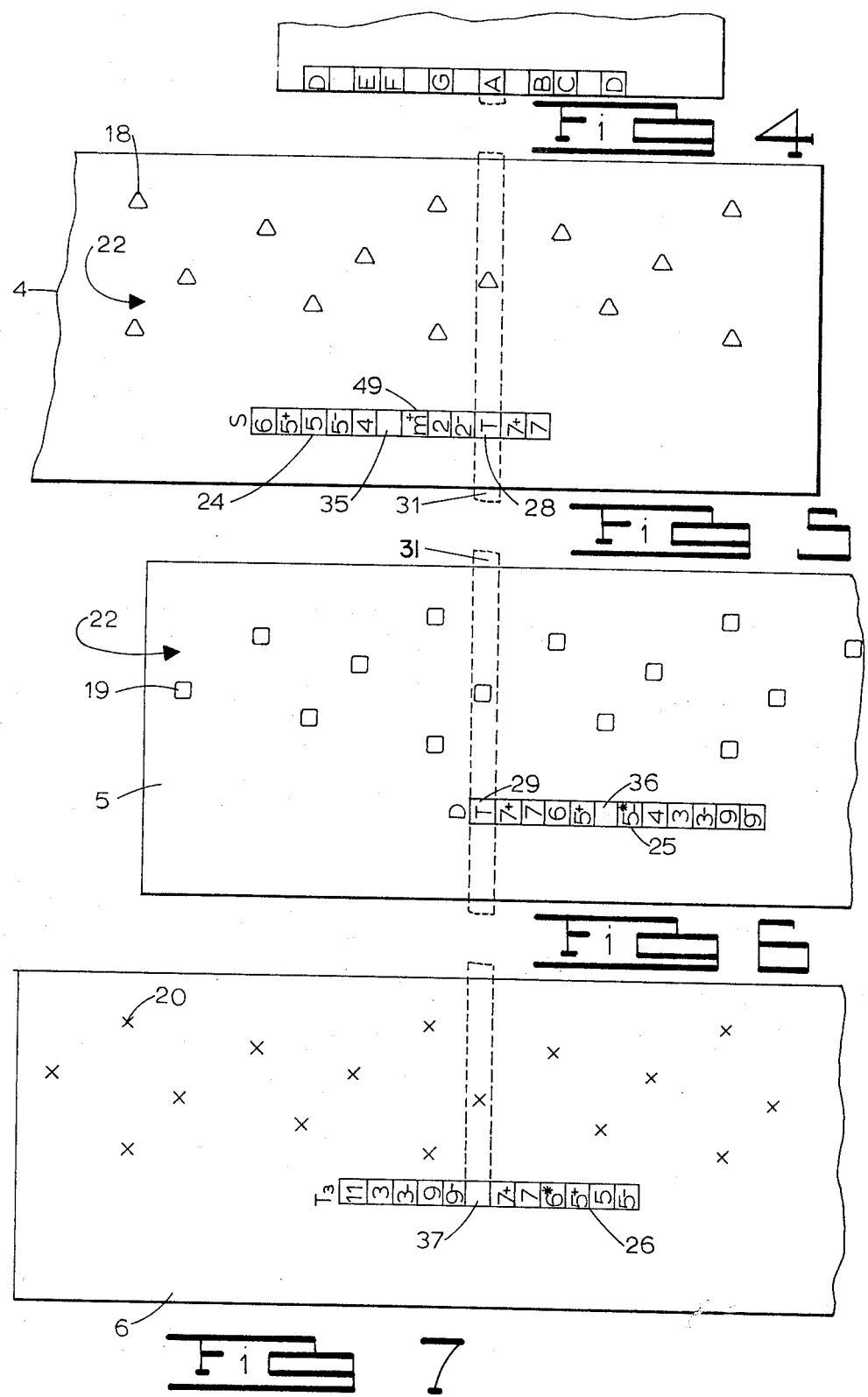

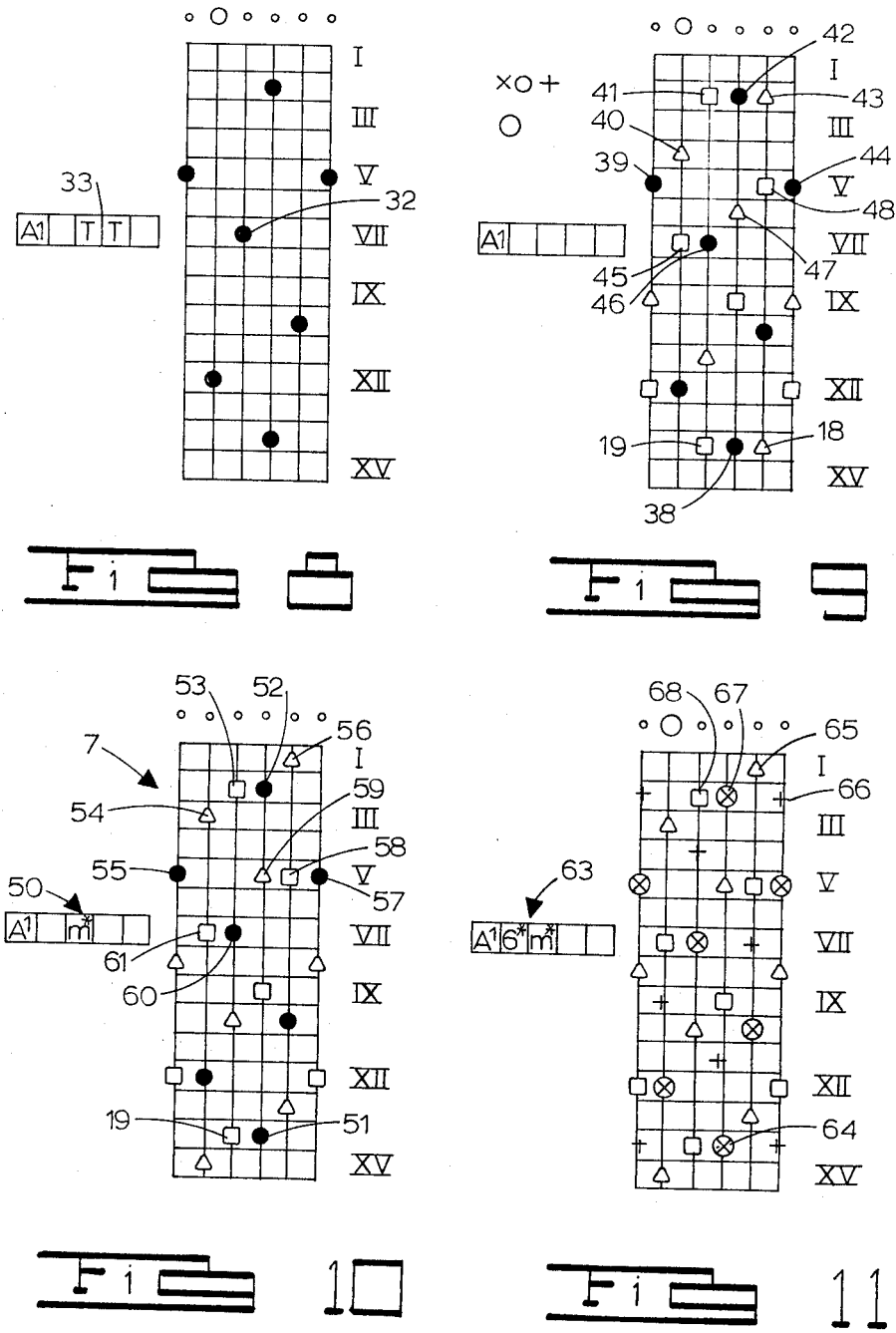

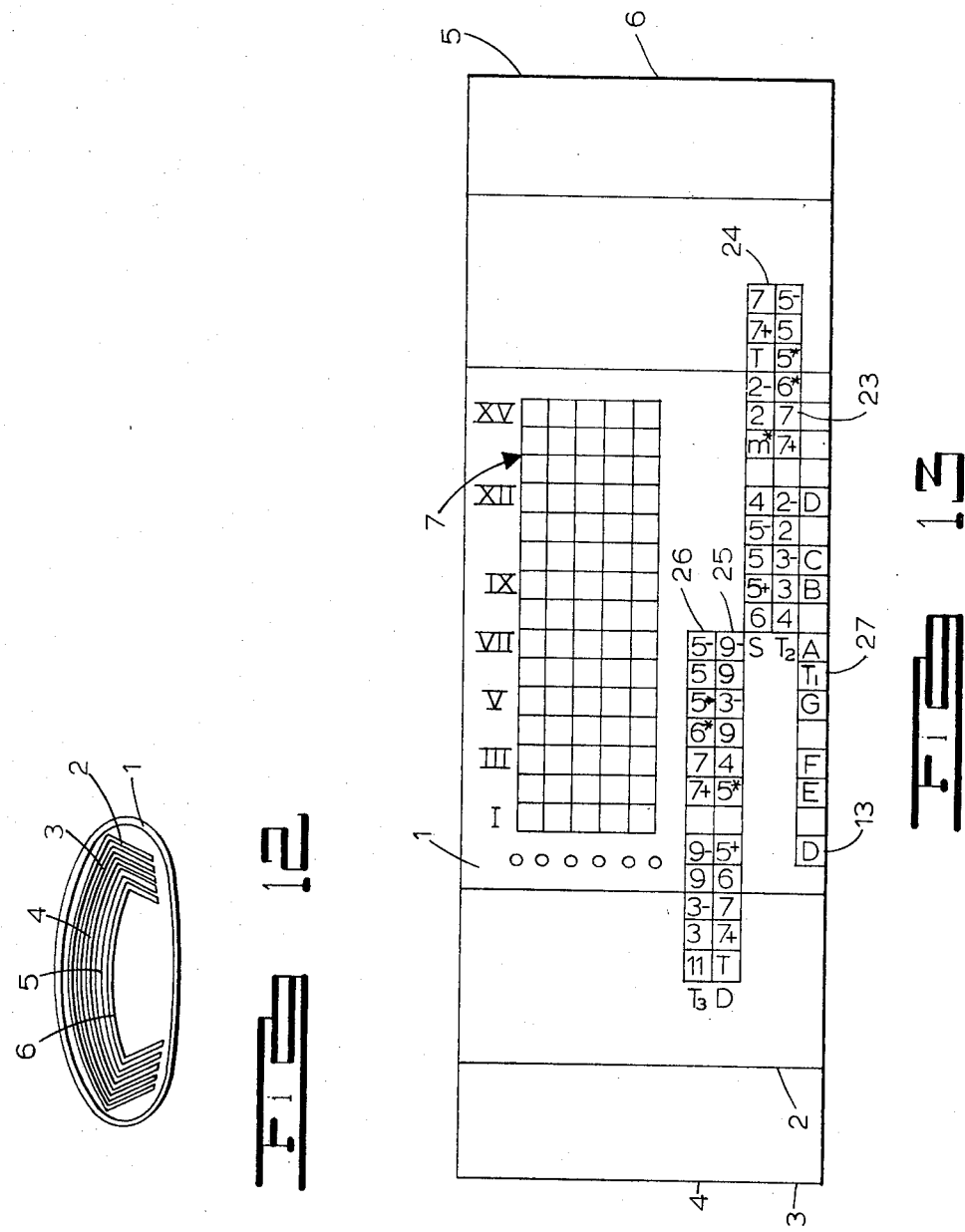

3,712,167

CHORD SLIDE RULE FOR MUSICAL INSTRUMENTS

BACKGROUND OF THE INVENTION

1. Field of the Invention

This invention lies in the field of slide rules and in particular those slide rules for determining the finger positions on the finger board of a stringed instrument to achieve a particular desired chord.

2. Description of the Prior Art

To the knowledge of the inventor there is no device such as the one disclosed by this invention. Up to now the players of stringed instruments such as guitars or banjos have been required to look up finger board positions for particular chords in dictionaries or other books in which the finger board positions for chords are displayed. The chord dictionaries are difficult to use for beginners and they are not sufficiently exhaustive for professionals since they do not present all possible finger positions nor all possible chords playable. Up until the present invention there was no device in the prior art which is suitable for actually determining finger board positions on a stringed instrument for a predetermined chord. A complete chord dictionary would have to show approximately 500,000 chord diagrams in order to exhaustively exploit the harmonic possibilities of a six-stringed instrument such as a guitar.

Summary of Invention

It is therefore an object of this invention to provide a slide rule on which can be determined and displayed the finger board positions on a stringed instrument for chords playable thereon.

Another object of this invention is to provide a lightweight, convenient and easily transportable slide rule for use with a stringed musical instrument to determine the finger board positions for chords playable on the instrument.

Another object of this invention is to provide a device on which the fingering of a particular chord and all of its inversions can be visualized.

Another object of this invention is to provide a device whereby the finger board position for chords playable on a stringed instrument are displayable, which device is easily adaptable to all stringed instruments in general.

Another object of this invention is to provide a device whereon the determination of the finger board positions for any playable chord in any key is readily obtainable.

Another object of this invention is to provide a slide rule for the display of the finger board positions for chords for a stringed instrument wherein a plurality of independently slidable cursors are provided so that various desired information can be added to the slide rule to achieve a display of a finger board position for any chosen chord.

The slide rule comprising the present invention consists of a primary or principal transparent cursor and a plurality of transparent secondary cursors all connected together to form a single unit with each cursor being independent of and slidable relative to the other cursors. A grill having one set of parallel lines representing the strings of a musical instrument and a perpendicular set of parallel lines representing the fretts of the stringed instrument are displayed upon the principal cursor along with a scale of tonalities (or keys).

A plurality of symbols and marks are provided on the secondary cursors in a predetermined manner so that the cursors can be moved relative to each other for particular chords and keys desired to be played in order to display upon the grill of the primary cursor the finger board positions to achieve a particular chord to be played on the stringed instrument.

Other objects and advantages of the invention will become apparent as the same is better understood from the following description accompanied by the detailed drawings, wherein:

FIG. 1 is a schematic view of the principal cursor of the slide rule.

FIG. 2 is a schematic view of the first secondary cursor of the slide rule.

FIG. 3 is a partial view of the second secondary cursor of the slide rule.

FIG. 4 is a drawing of a portion of the principal cursor shown in FIG. 1 showing the tonality of key scale portion of said primary cursor.

FIG. 5 is a partial view of the third secondary cursor of the slide rule.

FIG. 6 is a partial view of the fourth secondary cursor of the slide rule.

FIG. 7 is a partial view of the fifth secondary cursor of the slide rule.

FIG. 8 is a view of the assembled device with the secondary cursors being arranged to show the finger positions on each string to achieve the note A.

FIG. 9 is a view of the assembled slide rule with the secondary cursors being arranged relative to the primary cursor to display all possible finger board positions for the A major chord.

FIG. 10 is a view of the assembled device with the secondary cursors being arranged relative to the primary cursor to show all possible finger board positions to play the A minor chord.

FIG. 11 is a view of the assembled device with the secondary cursors being arranged relative to the primary cursor to show all possible finger board positions to play the chord of A minor with an added major sixth.

FIG. 12 is a cross-sectional view of the slide rule showing the relative positions of all of the cursors.

FIG. 13 is a top schematic view of the slide rule as assembled with the principal and secondary cursors arranged to show their different lengths and the relative positions of the scales contained thereon.

While the slide rule to be described in detail here applies to the guitar or other instrument with the same number of strings, it can be readily adapted for use with other stringed instruments, such as the banjo, which adaptations will become apparent from an understanding of the following detailed description of the invention.

Referring now to the drawings wherein like numbers represent like parts, it will be seen that the slide rule as shown in cross-section in FIG. 12 consists of a primary cursor 1, and secondary cursors 2, 3, 4, 5 and 6. The primary cursor 1 is transparent and made of flexible material with a grill 7 affixed thereto having longitudinal lines 8 representing the strings of an instrument, and transverse lines 9 representing the fretts of the instrument to separate the finger board subdivisions 10. Grill 7 represents the finger board of the instrument, longitudinal lines 8 representing the strings of the instrument are further shown by the small circles 11 at the top of the grill and the intervals between fretts are identified by Roman numerals 12. The intervals used in the slide rule described represent degrees of the diatonic major mode although the slide rule is easily useable in all keys with 12 semi-tones. The grill 7 thus represents at least 12 intervals augmented up to 15 in order to facilitate reading. The principal cursor also carries a longitudinal scale 13 called the tonality scale. The 12 semi-tones of the scale are depicted on tonality scale 13 corresponding to an octave from D to D, designated 14 and 15 respectively.

The secondary cursors, 2 through 6, have affixed thereto a plurality of spots or marks which are different in order to differentiate between the various cursors when the device is assembled. Thus the spots on the first secondary cursor are circles, those on the second secondary cursor are crosses, those on the third secondary cursor are triangles, those on the fourth secondary cursor are squares and those on the fifth secondary cursor are x's. Of course any system of varied or colored marks may be used to differentiate between cursors or perforations could be substituted for marks. The marks on each cursor are regularly spaced to fall between the transverse lines 9 on grill 7 and each are aligned so that when the device is assembled the spots or marks fall beneath a longitudinal line 8 representing a string of the instrument to thereby indicate a finger position for a particular note or chord. Displayed upon each secondary cursor 3 through 6 are semi-tone scales 23, 24, 25 and 26 respectively. These scales are displayed longitudinally on their respective cursors and are divided into semi-tones. The semi-tones shown on each scale, 23, 24, 25 and 26 are different with the scale 27 displayed on secondary cursor 2 being reduced to a single interval corresponding to the tonic of any chord.

As shown in each interval scale 23–27 the numbers within the squares represent the degree of the musical scale relative to a tonic. For example the number 5 on a particular interval scale, such as scale 23, represents the 5th degree relative to a tonic of a scale, i.e. E relative to the tonic of the diatonic A major scale. The symbol + after a number represents an augmented degree, the symbol − represents a diminished degree. For example 5+ represents F natural on the augmented 5th relative to the tonic of the A major diatonic scale, and 5− represents D sharp or the diminished 5th relative to the tonic of the A major diatonic scale. Special symbols such as M or * are used to designate intervals of special chords, such as minor and diminished 7th chords.

The spots on each cursor are arranged according to the distribution of finger positions of a single note on the finger board of a stringed instrument. Therefore when all secondary cursors are aligned so that their spots are superimposed, all possible finger positions of a note will be displayed on the grill. The parallel dotted lines 30 and 31 in FIGS. 1–7 show the alignment of the secondary cursors relative to the primary cursor and relative to each other to display on grill 7 the finger positions on a stringed instrument for the tonic A.

Symbols T, T 2 and T 3 of scales 27, 23 and 26 of secondary cursors 2, 3 and 6 respectively, designate interval scales. Symbol T of scale 27 and the blank squares of scales 23 and 26 correspond to the tonic, or first degree, of a musical scale. Thus if transparent cursors 2, 3 and/or 6 are placed in a plane parallel to the principal cursor 1 and beneath grill 7 with the blank squares aligned transversally across the slide rule on a semi-tone of the tonality scale 13, the grill 7 will display the corresponding finger positions on each string of the instrument required to play the note displayed on the tonality scale. The symbol s on third secondary cursor 4 designates the interval scale 24 on which a blank square 35 represents the subdominant or third degree of a musical scale and T, 28, represents its tonic. The symbol D on secondary cursor 5 designates the interval scale 25 on which a blank square 36 represents the dominant or fifth degree of a musical scale and T, 29, represents its tonic. The fingering position of the tonics on these scales can be displayed on grill 7 as heretofore described.

Depicted in FIG. 8 is the assembled device with the secondary slides aligned to show the tonic for the note A (LA) of the tonality scale on the principal cursor. Each of the secondary cursors, 2 through 6, have been aligned so that the blank squares or the squares with T contained therein are aligned with A on the tonality scale 13 so that marks 16 through 20 of secondary cursors 2 through 6 respectively are superimposed one upon the other in separate parallel planes. Thus the finger positions 32 show which position each string must be stopped at on the instrument in order to play the note A. Displacement of one or more of the cursors to a different position relative to the tonality scale 13 would cause a display on the grill of different combinations of intervals on the instrument in accordance with the positioning of the cursors.

The symbols used in the semi-tone scales 23 through 26 of secondary cursors 3 through 6 respectively have been chosen in a particular, but non-restrictive fashion in order to permit a simplified use of the slide rule with frequently encountered chord symbols. The information depicted in each of the scales is designated to correspond to chords normally used on popular music so that the user can read the chord positions from the chord symbols on the music.

The alignment of the blank squares of each of the secondary cursors is designed to depict on grill 7 the finger positions for the major chord of the tonality with which the secondary cursors are aligned on tonality scale 13. Such an alignment for the key of A major is depicted in FIG. 9. In this figure the mark 38 corresponds to the super-position of the marks 16, 17 and 20 of secondary cursors 2, 3 and 6 respectively with the marks 18 and 19 of secondary cursors 4 and 5 respectively appearing independently on the grill.

Comparing FIGS. 8 and 9 it will be seen that marks 32 in FIG. 8 correspond exactly with marks 38 of FIG. 9 while the other two sets of marks on the grill 7 shown in FIG. 9 indicate two additional finger positions with which the player can achieve an A major chord by playing on three to six strings. Assuming that the fundamental chord position of A major chord as shown in FIG. 9 is represented by the marks 39, 40 and 41, it becomes obvious that the grill shows all possible inversions of this chord by a combination of circles, triangles, and squares 41, 42 and 43; 41, 43, 43, 44; 39, 45, 46, 47, 48 and 44. Obviously other finger positions are possible to achieve the same chord, which is one advantage of this slide rule. The user can choose the combination of fingering positions which suits him best from the various possibilities presented.

Other symbols are depicted on the semi-tone scales. Referring specifically to FIG. 5 it will be seen that semi-tone scale 24 has included therein the symbol M* designated by the numeral 49. This symbol indicates a minor chord. In order to add a minor chord to the scale and depict the proper finger positions on grill 7, it is sufficient to transversally align the blank squares of the other semi-tone scales with tonality scale 13 and add the M* symbol from cursor 4 to the alignment. This alignment is depicted in FIG. 10 to show the finger positions to achieve the A minor chord. It will be seen that marks 51 are identical to marks 32 in FIG. 8 and marks 38 in FIG. 9. The only difference in this grill and that shown in FIG. 9 is that the sub-dominant semi-tone scale 24 has been displaced. Thus on grill 7 in FIG. 10, various possible finger positions to achieve the A minor chord are shown, such as 52, 53, 54, 55; 56, 52, 53; 57, 58, 59, 60, 61, 65.

Interval scale 23 on second secondary slide 3 depicts the perfect major and minor chords with an added sixth designated by symbol 6*, numbered 62, shown in FIG. 3. A minor chord with an added sixth is depicted in FIG. 11. In order to determine the finger positions for this chord the cursors are placed in alignment with the A of tonality scale 13 with the 6* symbol of the second tonality scale, 62, and the M* position of the third tonality scale 49 aligned with the note A on tonality scale 13 of the primary cursor 1. Thus it is seen that an A minor chord with an added major sixth may be achieved by the finger position shown at 65, 66, 67 and 68.

Obviously one can augment the particular symbols on any one or more of the semi-tone scales for the purpose of handling frequently encountered chords with greater ease.

Referring now to FIGS. 12 and 13 it will be seen that the assembled slide rule is displayed with FIG. 12 being a cross-sectional view of the device and FIG. 13 being a top view of the assembled device. Principal cursor 1 in this modification of the invention is used as an encasement for the secondary cursors. This is one way in which the slide rule can be made. Other embodiments of this invention are obvious in view of the teachings of the disclosure with the primary requirement being that the cursors be transparent if one overlaps the other and that they be independently moveable relative to each other.

FIG. 13 shows the assembled slide rule in the folded up configuration depicting the relative disposition of the scales in order to facilitate their movement relative to each other. This assemblage can be modified in many obvious ways without departing from the spirit of this invention. As shown in FIG. 13 the scales 23 and 24 are displaced with respect to scale 26 so that they can be displayed and seen easily. Other ways of achieving the same results are obvious.

As shown in FIG. 13 the different scales have been represented adjacent to each other in order to facilitate the alignment of the intervals for each given chord. Additionally the cursors have been depicted in a particular geometrical configuration, that is with arched surfaces, but could be flat, circular or cylindrical without departing from the spirit of the invention. Additionally other symbols could be added to the cursors or cursors could be added for the purpose of obtaining certain chords, and different arrangements of the printed matter can be achieved to accomplish the same results as the invention.

What is claimed is:

1. A slide rule for determining and displaying finger positions for various chords on the finger board of a stringed instrument, the combination comprising:

a primary transparent cursor on which is displayed the finger board grill of a stringed instrument and a tonality scale;

a plurality of secondary transparent cursors arranged one beneath the other and beneath said primary transparent cursor slideable beneath said primary cursor and relative to each other;

marks and scales displayed upon said plurality of secondary cursors;

whereby said secondary cursors may be manipulated relative to each other and relative to said primary cursor in a predetermined manner to display the finger positions on a stringed instrument for a particular desired chord.

2. The invention as defined in claim 1, wherein:

the finger board grill displayed on said primary transparent cursor consists of a plurality of parallel lines affixed to the face of said primary cursor extending parallel to the longitudinal axis of the surface plane of said primary cursor representing the strings of an instrument and a plurality of transverse lines intersecting said plurality of longitudinal lines, said transverse lines being perpendicular to the longitudinal axis of the surface plane of said primary transparent cursor, said transverse lines representing the fretts of an instrument;

whereby the combination of said longitudinal lines and said transverse lines form a grill representing the finger board of a stringed instrument.

3. The invention as defined in claim 2, wherein:

the marks displayed upon each of said plurality of secondary cursors are different for each cursor so that when said cursors are arranged in operative manner the marks on each cursor can be differentiated from the marks on each other cursor.

4. The invention as defined in claim 3, wherein:

the plurality of marks on each secondary cursor are regularly spaced to correspond with the transverse lines on the primary cursor and to fall beneath one of the longitudinal lines on said primary cursor when the device is assembled in its operative position.

5. The invention as defined in claim 4, wherein:

the scale displayed upon said primary cursor is parallel to the longitudinal axis of the surface plane of said primary cursor and is a musical tonality scale with the twelve semi-tones displayed thereon corresponding to an octave of the musical scale.

6. The invention as defined in claim 5, wherein:

said plurality of secondary cursors consists of five secondary cursors, four of which have semi-tone scales affixed thereto parallel to the longitudinal axis of the plane of the face of said scale arranged in a predetermined manner to correspond to the marks on said secondary cursor; and the fifth of which secondary cursor has a single interval affixed thereto corresponding to the tonic of any chord with the marks on this secondary cursor being previously arranged to display on the grill of said primary cursor the fingering position for the tonic of a particular semi-tone when the single interval on said secondary cursor is aligned with a particular note on the semi-tone scale of said primary cursor.

* * * * *